(12) United States Patent
Greger et al.

(10) Patent No.: US 11,613,619 B2
(45) Date of Patent: Mar. 28, 2023

(54) MOLDING COMPOSITIONS AND FOAM MOLDED ARTICLES MADE THEREOF

(71) Applicant: Kraton Polymers LLC, Houston, TX (US)

(72) Inventors: Marcus Greger, Amsterdam (NL); Kathryn Wright, Houston, TX (US)

(73) Assignee: KRATON CORPORATION, Houston, TX (US)

( * ) Notice: Subject to any disclaimer, the term of this patent is extended or adjusted under 35 U.S.C. 154(b) by 350 days.

(21) Appl. No.: 15/929,786

(22) Filed: May 21, 2020

(65) Prior Publication Data

US 2020/0377683 A1  Dec. 3, 2020

Related U.S. Application Data

(60) Provisional application No. 62/854,070, filed on May 29, 2019.

(51) Int. Cl.
| | | |
|---|---|---|
| *C08J 9/00* | (2006.01) | |
| *C08J 9/12* | (2006.01) | |
| *C08F 212/08* | (2006.01) | |
| *B29C 48/00* | (2019.01) | |
| *B29C 45/14* | (2006.01) | |
| *C08F 8/04* | (2006.01) | |
| *C08F 236/06* | (2006.01) | |
| *C08F 236/08* | (2006.01) | |
| *C08J 9/14* | (2006.01) | |
| *C08K 5/00* | (2006.01) | |
| *C08K 5/01* | (2006.01) | |
| *C08K 5/09* | (2006.01) | |
| *C08L 53/02* | (2006.01) | |

(52) U.S. Cl.
CPC ....... *C08J 9/0061* (2013.01); *B29C 45/14795* (2013.01); *B29C 48/0012* (2019.02); *C08F 8/04* (2013.01); *C08F 212/08* (2013.01); *C08F 236/06* (2013.01); *C08F 236/08* (2013.01); *C08J 9/122* (2013.01); *C08J 9/125* (2013.01); *C08J 9/141* (2013.01); *C08J 9/144* (2013.01); *C08K 5/0016* (2013.01); *C08K 5/01* (2013.01); *C08K 5/09* (2013.01); *C08L 53/025* (2013.01); *C08J 2205/06* (2013.01); *C08J 2323/12* (2013.01); *C08J 2325/10* (2013.01); *C08L 2203/14* (2013.01); *C08L 2205/03* (2013.01)

(58) Field of Classification Search
CPC . C08J 9/0061; C08J 9/122; C08J 9/125; C08J 9/141; C08J 9/144; C08J 2205/06; C08J 2323/12; C08J 2325/10; C08J 9/34; C08J 2201/03; C08J 2353/02; C08J 2423/10; C08J 2453/02; C08J 9/146; C08J 2203/06; C08J 2203/142; C08J 2203/184; C08J 2423/12; C08J 2423/14; C08J 2483/04; C08J 2491/06; C08J 9/0023; C08J 9/36; B29C 45/14795; B29C 48/0012; B29C 44/42; C08F 8/04; C08F 212/08; C08F 236/06; C08F 236/08; C08K 5/0016; C08K 5/01; C08K 5/09; C08L 53/025; C08L 2203/14; C08L 2205/03; C08L 2205/025; C08L 23/12; C08L 101/00
See application file for complete search history.

(56) References Cited

U.S. PATENT DOCUMENTS

| | | | |
|---|---|---|---|
| 6,177,521 B1 | 1/2001 | Gibler et al. | |
| 7,169,848 B2 | 1/2007 | Bening et al. | |
| 8,008,398 B2 | 8/2011 | Muyldermans | |
| 9,243,163 B2 | 1/2016 | Salazar | |
| 2007/0225428 A1* | 9/2007 | Bening | ................ C08L 51/006 524/505 |
| 2009/0152754 A1 | 6/2009 | Fuse et al. | |
| 2017/0333984 A1* | 11/2017 | Miyauchi | ............... B22D 17/26 |

FOREIGN PATENT DOCUMENTS

| | | | | |
|---|---|---|---|---|
| DE | 10014156 A1 * | 10/2001 | ......... | B29C 44/0407 |
| JP | 2006175825 A | 7/2006 | | |
| JP | 2015098542 A | 5/2015 | | |

OTHER PUBLICATIONS

An Injection Foaming Process by José Antonio Reglero Ruiz et al., Jun. 2015 Conference: 31st International Conference of the Polymer Processing Society (pp. 31) (Year: 2015).*

* cited by examiner

*Primary Examiner* — Irina S Zemel

(57) ABSTRACT

A foamed article formed by foam injection molding or foam extrusion of a composition is disclosed. The article is formed from a molding composition consisting essentially of: 100 phr of at least two different hydrogenated styrenic block copolymers (HSBC), a first HSBC and a second HSBC, having different molecular weights, a molecular weight ratio of at least 1.2:1, respectively; and a weight ratio of ranging from 5:95 to 95:5, respectively; 10-55 phr of a polypropylene having a melt flow of at least 2 g10/min; and optionally up to 55 phr of a plasticizer, selected from hydrocarbon based oils, fatty acids, triglyceride oils, and mixtures thereof. The composition has a melt flow rate of 2-50 g/10 min, a Shore A hardness of 60-90, a melt strength (F) of at least 0.010 N, and a melt strength (V) of at least 10.

20 Claims, 1 Drawing Sheet

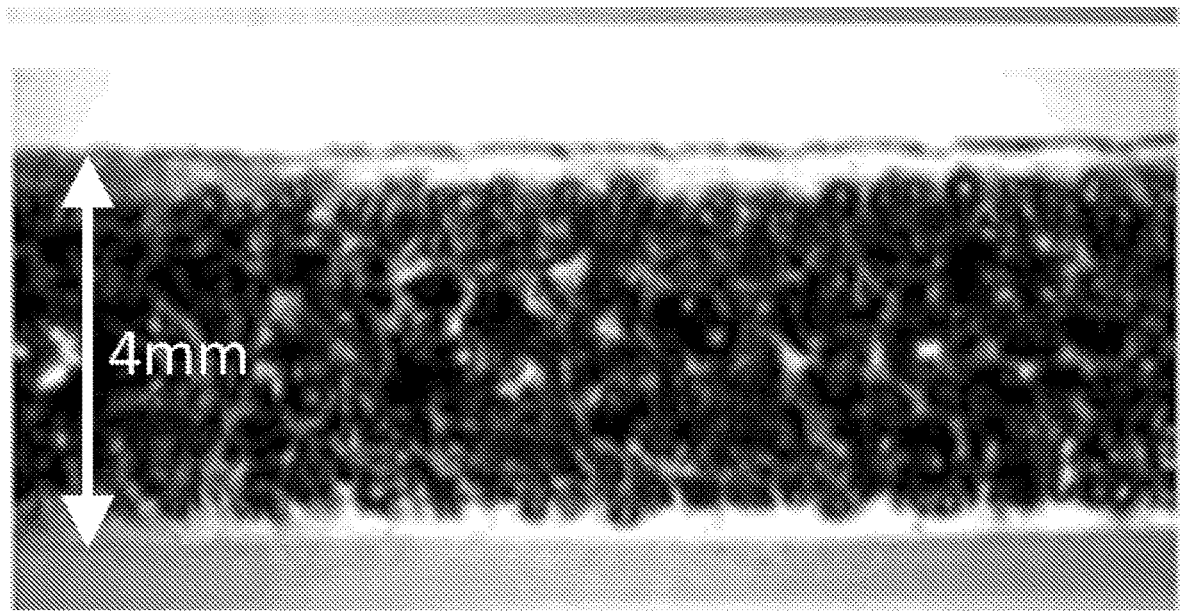

MOLDING COMPOSITIONS AND FOAM MOLDED ARTICLES MADE THEREOF

RELATED APPLICATIONS

This application claims priority from U.S. Provisional Application No. 62/854,070, with a filing date of May 29, 2019, the entire disclosure is incorporated herein by reference.

FIELD

This disclosure relates to a molding composition, methods for preparation, and articles made thereof.

BACKGROUND

Interior automobile components commonly have cushioned, soft-touch aesthetic features. Molding compositions containing polymer foams play an important role in the manufacturing of such automobile components, due to the steadily increasing demand for automobiles with lightweight design. The "cushioned" feature can be imparted by compositions containing flexible polymer foam or elastomeric pad of varying thickness, with a "soft skin" material, which is a relatively harder material. Such automobile components can be produced in a core back injection molding process, producing multiple layers in the same process.

There is a need for improved molding compositions for the production of articles such as interior automobile components via the core back injection molding process, having a high density reduction in combination with properties such as ease of processability and desirable hardness.

SUMMARY

In one aspect, the disclosure relates to a foamed article made from a composition consisting essentially of: 100 phr of at least two different hydrogenated styrenic block copolymers (HSBC), a first HSBC and a second HSBC, having different molecular weights, a molecular weight ratio of at least 1.2:1, respectively; and a weight ratio of ranging from 5:95 to 95:5, respectively; 10-55 phr of a polypropylene having a melt flow of at least 2 g10/min according to ASTM D1238-82 (230° C./5 kg); and optionally up to 55 phr of a plasticizer, selected from hydrocarbon based oils, fatty acids, triglyceride oils, and mixtures thereof. The composition has a melt flow rate of 2-50 g/10 min (230° C., 2.16 kg per as measured by ASTM D1238-04), a Shore A hardness of 60-90 (15 sec, 23° C.) as measured according to ISO 868, a melt strength (F) of at least 0.010 N, and a melt strength (V) of at least 10. The foamed article is formed by foam injection molding or foam extrusion and has a density reduced by at least 10% relative to an article formed from the composition that has not been foamed. The foamed article has a non-foamed skin layer completely encasing a foamed inner core.

BRIEF DESCRIPTION OF THE FIGURES

FIG. 1 is an optical microscopy image of a cross section of a foamed sample obtained from the formula of Example 9.

DESCRIPTION

The following terms are used in the specification and will have the following meanings:

"phr" means parts per hundred parts of styrenic block copolymer (SBC).

"Molecular weight" refers to the styrene equivalent molecular weight in g/mol of a polymer block or a block copolymer. The molecular weights can be measured with gel permeation chromatography (GPC) using polystyrene calibration standards, such as is done according to ASTM 5296-19. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector can be a combination ultraviolet and refractive index detector. The molecular weights expressed herein are measured at the peak of the GPC trace, converted to true molecular weights, and are commonly referred to as "peak molecular weights", designated as Mp. Unless converted to true molecular weights, as described above, the molecular weights refer to the styrene equivalent peak molecular weights.

"Polystyrene content" or PSC of a block copolymer refers to the % weight of polymerized styrene in the block copolymer, calculated by dividing the sum of molecular weight of all polystyrene blocks by the total molecular weight of the block copolymer. PSC can be determined using any suitable methodology such as proton nuclear magnetic resonance (NMR).

"Melt Flow Rate" or "MFR" of components in the molding composition can be measured in accordance with ISO 1133-1 at a temperature of 230° C. and under a load condition of 2.16 kg. Melt Flow Rate can also be measured according to ASTM D1238-04 at a temperature of 230° C. and under a load condition of 2.16 kg.

"Shore A hardness" is a measure of indentation resistance of elastomeric or soft plastic materials based on the depth of penetration of a conical indentor, and can be measured according to ISO-868.

"Melt strength" refers to the resistance of the polymer melt to stretching, or extensional viscosity a polymer composition, which can be determined by the Goettfert Rheotens device, where a molten extrudate or fiber strand is pulled between two powered rollers as it leaves a downward-extruding orifice. As the speed of the rollers is increased, tension is created in the strand, which is measured by the Rheotens device. The force required to extend and then break the extrudate is defined as the melt strength, with the maximum draw-off speed or melt strength (V) as a relative measurement for the "elongation" of the melt, and the maximum force or melt strength (F) as a relative value for the melt strength measured in Newtons (N). The melt strength is measured at 230° C. unless otherwise indicated.

"A/B" refers to a polymer block having a controlled distribution of monoalkenyl arene units in the diene polymer block. For example, B/S refers to a polymer block having a controlled distribution of styrene in the butadiene block.

The disclosure relates to a "foamed" article having a foam inner layer, and a (more) dense soft skin. The article is formed from a molding composition comprising at least two styrenic block copolymer components, a high melt flow polypropylene, and optional plasticizers and additives.

Styrenic Block Copolymer (SBC) Components: The molding composition comprises two or more hydrogenated styrenic block copolymers (HSBCs) that are different in molecular weight. The different HSBCs suitable for use, independently include, but are not limited to selectively hydrogenated styrene-diene block copolymers, selectively hydrogenated styrene-diene-styrene triblock copolymers, selectively hydrogenated styrene-diene diblock copolymers, selectively hydrogenated resins of styrene-diene-styrene triblock copolymers, selectively hydrogenated styrene-diene random copolymers, selectively hydrogenated styrene-diene random copolymers, selectively hydrogenated controlled distribution styrene-diene/styrene block copolymers, selectively hydrogenated controlled distribution styrene-diene/styrene-styrene block copolymers, and combinations thereof. The diene can be any conjugated diene, such as for example, butadiene, isoprene, 2,3-dimethyl-1,3-butadiene, chloroprene, and piperylene, or any combination thereof.

In embodiments, the HSBC composition, prior to hydrogenation, comprises a styrenic diblock copolymer (SBC), comprising an A block and a B block designated A-B, a linear triblock copolymer of formula A-B-A where each A block can be of a different or identical peak molecular weight or of the same or different monoalkenyl arene content, and/or a multi-arm coupled block copolymer of formula $(A-B)_nX$. In such aspects, A is a monoalkenyl arene block, B is a conjugated diene block, n is an integer from 2 to 6, and X is the residue of a coupling agent. When the multi-arm coupled block copolymers of the formula $(A-B)_nX$ are utilized, n ranges from 2 to 4.

In embodiments, the SBC is a controlled distribution styrenic block copolymer, which can be a styrenic diblock copolymer of formula A-B, a linear triblock copolymer of formula A-B-A, and/or a multi-arm coupled block copolymer of formula $(A-B)_nX$ where the type and values for A, B, X and n have been previously disclosed herein.

In one embodiment, the HSBC composition comprises a hydrogenated styrenic block copolymer (HSBC), which prior to hydrogenation, is one or more SBCs comprising: a styrenic diblock copolymer of formula A-B, a linear triblock copolymer of formula A-B-A, and/or a multi-arm coupled block copolymer of formula $(A-B)_nX$ where the type and values for A, B, X and n have been previously disclosed herein. In one embodiment, the HSBC is a hydrogenated resin of a styrene-isoprene-styrene triblock copolymer, a hydrogenated resin of a styrene-butadiene-styrene triblock copolymer, or a resin wherein a specific part of the polymerized conjugated diene (e.g., butadiene) is selectively hydrogenated. In one embodiment, the HSBC comprises a B block wherein addition of hydrogen molecules has occurred across greater than 92 mol %; or greater than 95 mol %; or greater than 98 mol % of the carbon-carbon double bonds within the B block. In another embodiment, the HSBC is a partially-saturated hydrogenated styrenic block copolymer with a B block wherein addition of hydrogen molecules has occurred across from 20 mol % to 92 mol %; or 25 mol % to 85 mol %; or 30 mol % to 80 mol % of the carbon-carbon double bonds within the B block.

The monoalkenyl arene block (A block) comprises any of styrene, o-methyl styrene, p-methyl styrene, p-tert-butyl styrene, 2,4-dimethyl styrene, alpha-methyl styrene, vinylnaphthalene, vinyltoluene, vinylxylene, or mixtures thereof. In embodiments, the monoalkenyl arene block comprises a substantially pure monoalkenyl arene monomer. In some embodiment, styrene is the major component in the A block with minor proportions (less than 10 wt. %) of structurally related vinyl aromatic monomers such as o-methylstyrene, p-methyl styrene, p-tert-butyl styrene, 2,4-dimethyl styrene, α-methylstyrene, vinylnaphtalene, vinyltoluene, vinylxylene or combinations thereof. In some embodiments, the peak molecular weight of each monoalkenyl arene block (e.g., A block) is in the range of 5,000-12,000 g/mol, or 5,000-11,000 g/mol, or 5,000-10,500 g/mol.

In embodiments, the monoalkenyl arene content of each A block is from 10 wt. % to 60 wt. %; or from 15 wt. %. to 50 wt. % based on the total weight of the SBC. In an aspect where the SBC is of formula A-B-A, the combined monoalkenyl arene content of all A blocks ranges from 10 wt. % to 60 wt. %; or from 15 wt. %. to 50 wt. % based on the total weight of the linear triblock copolymer. In some embodiments, the conjugated diene block (B block) comprises any suitable conjugated diene, e.g., conjugated diene having from 4 to 10 carbon atoms, conjugated diene formed from a butadiene monomer or an isoprene monomer that is a substantially pure monomer or contains minor proportions, up to 10% by weight, of structurally related conjugated dienes, e.g., 2,3-dimethyl-1,3-butadiene, 1,3-pentadiene and 1,3-hexadiene.

In embodiments, the HSBC is a linear, selectively hydrogenated form of a block copolymer having a structure S-B-S or $(S-B)_2X$, where B represents the conjugated diene block or the controlled distribution conjugated diene/styrene block, with peak molecular weight from 50,000 to 290,000 g/mol; or 70,000 to 150,000 g/mol; or 80,000 to 130,000 g/mol, or less than 150,000 g/mol.

In embodiments, the HSBC is a selectively hydrogenated copolymer having a structure, S-EB/S-S or (S-EB/S)nX, where X is a coupling agent residue and n is 1-6. The selectively hydrogenated copolymer has a controlled distribution of styrene in the midblock, i.e., EB/S, a total polystyrene content of about 58%, a total molecular weight of about 250 kg/mol, and a melt flow rate of <1 g/10 min at 230° C./2.16 kg, as disclosed in U.S. Pat. No. 7,169,848, incorporated by reference.

In embodiments, the HSBC is a selectively hydrogenated copolymer having a structure, S-EB/S-S or (S-EB/S)nX, where X is a coupling agent residue and n is 1-6. The selectively hydrogenated copolymer has a controlled distribution of styrene in the midblock, with a total polystyrene content of about 35%, a total molecular weight of about 125 kg/mol, and a melt flow rate of about 40 at 230° C./2.16 kg.

In embodiments, the HSBC is a selectively hydrogenated copolymer having a structure, S-EB-S or (S-EB)nX, where X is a coupling agent residue and n is 1-6. The selectively hydrogenated copolymer has a total polystyrene content of about 13%, a total molecular weight of about 150 kg/mol, and a melt flow rate of about 9 g/10 min at 230° C./2.16 kg, as disclosed in U.S. Pat. No. 6,177,521, incorporated by reference.

In embodiments, the HSBC is a selectively hydrogenated copolymer having a formula, S-EB-S or (S-EB)nX, where X is a coupling agent residue and n is 1-6. The selectively hydrogenated copolymer has a total polystyrene content of about 20%, a total molecular weight of about 67 kg/mol, and a melt flow rate of >100 g/10 min, or 100 g/10 min to 500 g/10 min, at 230° C./2.16 kg, as disclosed in U.S. Pat. No. 9,243,163, incorporated herein by reference.

In embodiments, the total polystyrene content (PSC) of the selectively hydrogenated block copolymer or selectively hydrogenated controlled distribution block copolymer is from 10 wt. % to 65 wt. %; or 10 wt. % to 50 wt. %; or 12 wt. % to 45 wt. %.

In embodiments when butadiene is the conjugated diene monomer, the vinyl content of the conjugated diene block (e.g., B block) ranges from 10 to 95 mol %, or 15 to 85 mol %, or 35 to 80 mol %. In aspects when isoprene is the conjugated diene monomer, the vinyl content of the B block ranges from 5 to 95 mol %, or 5 to 85 mol %, or 5 to 80 mol %.

In embodiments, the HSBC is a selectively hydrogenated styrene-diene block copolymer having a formula, S-EP-S, (S-EP)nX, S-EEP-S, (S-EEP)nX, S-EB-S, (S-EB)nX, S-EB/S-S, or (S-EB/S)nX, where S is a polystyrene block, EB is a hydrogenated polybutadiene block, EP is a hydrogenated polyisoprene block, EEP is a hydrogenated polymer block of butadiene and isoprene, n is 12 to 6, and X is a coupling agent residue. The selectively hydrogenated styrene-diene block copolymer, prior to hydrogenation, are styrenic block copolymers having a polybutadiene block with a vinyl content of from 10 to 95 mol %. The selectively hydrogenated styrene-diene block copolymer, has a total PSC of 10 wt. % to 65 wt. %.

In embodiments, the selectively hydrogenated styrene-diene block copolymer, prior to hydrogenation, are styrenic block copolymers comprising a diblock copolymer of formula A-B or A-B/A, a linear triblock copolymer of formula A-B-A or A-B/A-A, or a multi-arm coupled block copolymer of formula (A-B)nX or (A-B/A)nX, where A is a monoalkenyl arene polymer block, B is a conjugated diene polymer block, and B/A indicates a polymer block having a controlled distribution of monoalkenyl arene in the conjugated diene polymer block, n is 2 to 6, and X is a coupling agent residue. The selectively hydrogenated styrene-diene block copolymer, has at least 92 mol % of the polymerized butadiene units hydrogenated.

In embodiments, the selectively hydrogenated block copolymer or selectively hydrogenated controlled distribution block copolymer has a melt flow rate measured in accordance with ASTM D 1238 at 230 ° C. and 2.16 kg mass of 0.01 to 50 g/10 min; or alternatively 0.1 to 45 g/10 min; or alternatively 0.5 to 40 g/10 min.

The two different HSBC components are present in an amount of 100 phr, wherein the first and the second HSBC are present in a weight ratio ranging from 5:95 to 95:5, or from 10:90 to 90:10, or from 20:80 to 80:20, or from 30:70 to 70:30, respectively. In another embodiment, the at least two different HSBC components have a molecular weight ratio of at least 1.2:1, or at least 1.3:1, or at least 1.5:1, or at least 1.7:1 or at least 2.0:1.

Polypropylene Component: In embodiments, the polypropylene component is selected from: (i) a homopolymer of propylene, (ii) a random copolymer of propylene and an olefin selected from ethylene and $C_4$-$C_{10}$ α-olefins, or (ii) a random terpolymer of propylene with two α-olefins selected from the group of ethylene and $C_4$-$C_{10}$ α-olefins. The $C_4$-$C_{10}$ α-olefins include linear and branched $C_4$-$C_{10}$ α-olefins such as 1-butene, 1-pentene, 4-methyl-pentene-1, 3-methyl-1-butene, 1-hexene, 3-4-dimethyl-1-butene, 1-heptene, 3-methyl-1-hexene, 1-octene and the like.

In embodiments, the propylene component is a homopolymer of propylene. In other embodiments, the propylene polymer is a heterophasic propylene copolymer ("HECO") as disclosed in US20150017366A1, incorporated herein by reference. The copolymer comprises a polypropylene matrix with three different polypropylene fractions, having different melt flow rates, and wherein the HECO has a melt flow rate, MFR, (230° C.), measured according to ISO 1133, of equal to or more than 20.0 g/10 min.

In embodiments, the propylene polymer has a MFR higher than 2 g/10 min as measured by ASTM D1238-82 (230° C./5 kg), or at least 2.1 g/10 min, or at least 2.2 g/10 min.

In embodiments, the polypropylene component is present in an amount of 10 to 55 phr, or less than 50 phr, or at least 20 phr, or 30 to 45 phr, based on 100 phr of the total amount of the HSBC components.

Plasticizer Component: The molding composition optionally comprises a dispersion aid or a plasticizer, selected from aliphatic hydrocarbon based oils, fatty acids, triglyceride oils, and mixtures thereof. Examples include fatty oils (mixtures of animal or vegetable fatty acid triglycerides), mineral oils, and silicon oils.

In embodiments, the oil is selected from a mineral oil, a paraffinic oil, an oil-enriched in paraffin, and mixtures thereof. In some embodiments, the oil is a GTL-based process oil (or Fischer-Tropsch oil). In embodiments, the oil is a synthetic oil. In embodiments, the oil comprises diesel, biodiesel and carboxylic acid esters such as 2-ethylhexyl oleate.

The plasticizer is present in amounts of 0 to 55 phr (based on 100 phr of the total HSBC components), or less than 50 phr, or at least 20 phr, or 30 to 45 phr.

Other Polymeric Ingredients: In embodiments, the molding composition optionally comprises other polymeric components selected from thermoplastic polyurethane, thermoplastic copolyester, and engineering thermoplastic resins (polyamide, polyester, polyphenylene ether), poly(aryl ether), poly(aryl sulfone), acetal resin, nitrile barrier resins, poly(methyl methacrylate), cyclic olefin copolymers, coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether), copolymers thereof; and mixtures thereof.

Additives: In embodiments, the molding composition further comprises one or more additives selected from a nucleating agent, a clarifier, a release agent, an antioxidant, a stabilizer (such as a thermal stabilizer, a visible light stabilizer, an ultraviolet light stabilizer, a colorant, a flame retardant, a lubricant (such as calcium stearate), a synergist, a mold release agent, a flow enhancer, an anti-static agent, a glass filler, a filler that is different from the glass filler (such as talc), a scratch resistant additive/surface modifier (such as a silicone, a low density polyethylene that can be a long chain branched low density polyethylene), or a combination comprising at least one of the foregoing.

Examples of surface modifiers include ultra-high molecular weight polydialkyl siloxanes such as polydimethyl siloxanes, ultra high molecular weight polydialkyl siloxanes in combination with silica, polyolefin siloxanes and combinations thereof.

The additives may be present in the amount of 1 to 30 phr (based on 100 phr of total SBC components), or less than 25 phr, or at least 3 phr, or 5 to 25 phr.

Blowing Agent: In embodiments, blowing agents (i.e., propellants) are used with the foam injection molding (FIM) process. The blowing agents are not part of the molding composition, but added as an ingredient in the FIM process in an amount ranging from 1 to 5 wt. % based on the total weight of the molding composition.

The blowing agents can be any of chemical blowing agents, physical blowing agents, and/or microspheres. Examples of physical blowing agents include but are not limited to organic blowing agents, e.g., an aliphatic hydrocarbon such as nitrogen, carbon dioxide, water, propane, butane, pentane and cyclohexane; a halogenated hydrocarbon such as chlorodifluoromethane, difluoromethane, trifluoromethane, trichlorofluoromethane, dichloromethane, dichlorofluoromethane, dichlorodifluoromethane, and the like. Examples of chemical blowing agents include sodium hydrogencarbonate, ammonium hydrogencarbonate, ammonium chloride, ammonium carbonate and the like, which are blowing agents of thermal depcomposition type. Thermally explandable microsphere blowing agents typically have an outershell of a thermoplastic resin, and an expanding agent contained therein.

Properties of the Molding Composition: The molding composition is characterized as having a melt flow rate in the range of 2 to 50 g/10 min (230° C., 2.16 kg per as measured by ASTM D1238-04), or at least 5 g/10 min., or from 15 to 40 g/10 min, or at least 20 g/10 min, or less than 60 g/10 min.

In embodiments, the composition has a Shore A hardness from 60 to 90 (15 sec, 23° C.) as measured according to ISO 868, or in the range of 70 to 90, or at least 65.

In embodiments, the composition has a melt strength (F) or maximum force of at least 0.010 N, or at least 0.015 N, or at least 0.02 N, or at least 0.03N. In embodiments, the molding composition has a melt strength (V) or maximum draw-off speed of at least 10, or at least 15, or at least 20, or at least 25, or at least 30 when measured at 230° C.

Methods for forming articles: The molding composition can be processed according to methods known in the art, by combining the individual components and blending to form a blend, extruding the blend to form pellets, which are subsequently used to form articles, such as injection molded soft skinned articles in a molding or extrusion process, e.g., foam injection molding (FIM) process or profile extrusion.

In embodiments, the foam injection molding method is by a so-called core-back type injection molding method, in which the molding composition is injected into a cavity space formed in a metal mold of an injection molding apparatus, and, immediately or after the lapse of a predetermined time, a movable mold or a movable core provided in the movable mold is retracted with a predetermined rate to a predetermined position to expand the cavity space, thereby achieving foaming. Since the metal mold usually has a temperature considerably lower than the temperature of the thermoplastic elastomer composition during injection, a dense skin layer with scarce foaming is formed at the surface of the injection foaming product, formed in contact with the surface of the cavity. In embodiments, the foaming product can also be integrally formed in contact with a surface of a base body made of a resin and the like. The laminated article can be formed by positioning the base body in advance in the cavity space, and injecting the composition to the surface of the base body.

The composition can be used in either a low pressure process or a high pressure process. In the low-pressure process with a relatively low cavity pressure, the mold cavity is filled with 80 to 95% polymer gas melt. When the pressure drops in the mold, the melt can expand and fill up the remaining mold volume with a degree of foaming, in the range 5 to 20%. In the high-pressure process (also known as "precision mold opening" or "breathing mold technology"), the mold cavity is completely filled with polymer melt and then immediately opened by a few millimeters. Through this opening of the cavity, a pressure drop occurs and the melt is able to foam. The opening takes place by the pull-back of the clamping unit.

In embodiments, the foamed article can be formed by foam extrusion. In foam extrusion, the composition is mixed with a suitable blowing agent to form a mixture. An extruder barrel is filled with a melt of the mixture, and the mixture is extruded through a profile die creating a foamed structured by reduction of pressure and/or temperature. The foamed article is then cut to the desired dimensions.

Applications: The molding composition can be used for producing a number of light-weight vehicle type applications, and in particular, door panels, instrument panels, and consoles, etc., with a integral foam structure having a foamed core and a compact non-foamed skin layer. In embodiments, the composition is used for making shoe sole components, packaging/padding materials. In embodiments, the composition is used for making seals, gaskets, and synthetic corks.

Foamed Articles: Foamed articles, made by injection molding the composition, are characterized as having an optimized density reduction, improved surface quality, uniform internal air holes, and minimal thickness of the non-foamed skin layer, e.g., a dense skin of 0.1 to 5 mm, or less than 2.5 mm, or less than 3 mm thick, with a coreback, or foamed inner core, of at least 0.1 mm, or at least 1 mm, or at least 3 mm, or at least 4 mm, or 0.1 to 20 mm thick.

Foamed articles, made by extrusion, the composition are characterized as having an optimized density reduction, improved surface qualify, and uniform internal air holes, and minimal thickness of the non-foamed skin layer, e.g., a dense skin of 0.1 to 3 mm or less than 2 mm thick with an foamed inner core of 0.1 to 20 mm thick or at least 0.1mm thick.

In embodiments, the non-foamed skin layer completely encases the foamed inner core of the article.

In embodiments, the articles are characterized as having a density reduction of the molded article in the range of 5 to 40%, or at least 30%, or at least 15%, or at least 20%. The density reduction is given by comparing the density after foaming and the density before foaming (i.e., density of the solid compact polymer).

EXAMPLES

The examples are given by way of illustration.

The major components used in the examples follow:

HSBC7 is a medium MW hydrogenated styrene block copolymer with a structure (S-EB)nX, having a polystyrene content of 13%, a molecular weight of 145 kg/mol, and a mid-block (EB) vinyl content before hydrogenation of 44%.

HSBC8 is low MW styrene block copolymer with a structure (S-EB)nX, having a polystyrene content of 20%, a molecular weight of 67 kg/mol, and a mid-block (EB) vinyl content before hydrogenation of 77%.

HSBC5 is a high MW styrene block copolymer with a structure S-EB/S-S, having a polystyrene content of 58%, a molecular weight of 245 kg/mol, and a mid-block (S/EB) vinyl content before hydrogenation of 38%.

HSBC1 is medium MW styrene block copolymer with a structure (S-EB/S)nX, having a polystyrene content of 34%, a molecular weight of 125 kg/mol, and a mid-block (S/EB) vinyl content before hydrogenation of 77%.

HSBC3 is a low MW styrene block copolymer back-bone with a structure (S-EB)nX, having a polystyrene content of 30%, a molecular weight of 57 kg/mol, and a mid-block (EB) vinyl content before hydrogenation of 38%.

PP125 is a long chain branched polypropylene resin having a melt flow (230° C./2.16 kg) of 2.4 g/10 min, tensile strength of 40 MPa, elongation at yield of 6%.

PP140 is another long chain branched polypropylene resin having a melt flow (230° C./2.16 kg) of 2.1 g/10 min, tensile strength of 40 MPa, elongation at yield of 6%.

PP2030 is a homo polypropylene resin having a melt flow (230° C./2.16 kg) of 2.5 g/10 min.

PP185 is another homo polypropylene with having a melt flow (230° C./2.16 kg) of 2.2 g/10 min.

PP348 is a polypropylene random copolymer resin having a melt flow rate (230° C./2.16 kg) of 11 g/10 min, tensile strength of 29 Mpa, and elongation at yield of 13%.

Examples 1-20

The components, indicated in the tables as weight percent, were blended and extruded to form pellets, which are subsequently used to form foamed articles in a core-back injection molding process.

Properties of the molding composition were measured and are presented in Tables 1 and 2. For the melt strength measurements, the Rheotens trials are performed with 4 wheel apparatus below an extruder, with the spin length of 100 mm and the extruder throughput of 0.5 kg/hr. The instrument is run by cooling with alcohol. From measured data, value curves are calculated and elongation viscosity model of Wagner is applied.

For the foamed articles, an injection foam molding machine with a 3 zone extruder was used, with a test plate of 90×90×2 mm. The mold temperature varied from 40° C. up to 220° C. (T mold of 40° C., T zone 1 of 220° C., T zone 2 of 190° C., and T zone 3 of 180° C.). Injection speed was 90%, injection time was 0.58 sec. Back pressure was 23 bar, with back pressure time of 4 seconds. Foaming agent including a physical foaming agent (0.8% $CO_2$) and chemical foaming agent of 2.0% hydrocerol CF40E. The produced foamedarticle exhibits a skin thickness of about 2 mm, with a dense-skin/foamed thickness ratio of 1.0-2.0. The standard density reduction before and after the foaming was determined using a hydrostatic balance.

Results are as presented in Tables 1-2. FIG. 1 is an optical microscopy image of the cross section of a foamed sample obtained from Example 9 formula.

TABLE 1

| Example | 1 | 2 | 3 | 4 | 5 | 6 | 7 | 8 | 9 | 10 | 11 |
|---|---|---|---|---|---|---|---|---|---|---|---|
| HSBC7 | 50 | 55 | 55 | 55 | 55 | 60 | 55 | 50 | — | — | — |
| HSBC5 | — | — | — | — | — | — | — | — | 23.3 | 23.3 | 23.3 |
| HSBC1 | — | — | — | — | — | — | — | — | 23.2 | 33.2 | 36.4 |
| HSBC8 | 5 | 10 | 10 | 10 | 10 | 5 | 5 | 10 | — | — | — |
| PP125 | 23 | 23 | — | — | 13 | 23 | 23 | 23 | 23.2 | 23.2 | 20 |
| PP2030 | — | — | — | — | 10 | — | — | — | — | — | — |
| PP140 | — | — | 23 | — | — | — | — | — | — | — | — |
| PP185 | — | — | — | 23 | — | — | — | — | — | — | — |
| Medicinal grade white oil | 15 | 5 | 5 | 5 | 5 | 5 | 10 | 10 | 23.2 | 13.2 | 13.2 |
| Functionalized polysiloxane antiscratch agent | 3.5 | 3.5 | 3.5 | 3.5 | 3.5 | 3.5 | 3.5 | 3.5 | 3.6 | 3.6 | 3.6 |
| Sterically hindered phenolic primary antioxidant | 0.1 | 0.1 | 0.1 | 0.1 | 0.1 | 0.1 | 0.1 | 0.1 | 0.1 | 0.1 | 0.1 |
| Organo-phosphite processing stabilizer | 0.2 | 0.2 | 0.2 | 0.2 | 0.2 | 0.2 | 0.2 | 0.2 | 0.2 | 0.2 | 0.2 |
| hydroxyphenyl benzotriazole UV absorber | 0.3 | 0.3 | 0.3 | 0.3 | 0.3 | 0.3 | 0.3 | 0.3 | 0.3 | 0.3 | 0.3 |
| hindered amine light stabilizer | 0.4 | 0.4 | 0.4 | 0.4 | 0.4 | 0.4 | 0.4 | 0.4 | 0.4 | 0.4 | 0.4 |
| carbon black masterbatch colorant | 2.5 | 2.5 | 2.5 | 2.5 | 2.5 | 2.5 | 2.5 | 2.5 | 2.5 | 2.5 | 2.5 |
| Total | 100 | 100 | 100 | 100 | 100 | 100 | 100 | 100 | 100 | 100 | 100 |
| SEBS MW Ratio | 2.2 | 2.2 | 2.2 | 2.2 | 2.2 | 2.2 | 2.2 | 2.2 | 2 | 2 | 2 |
| MFR 230 C./2.16 kg | 36 | 6.8 | 7.4 | 4.2 | 5.8 | 16 | 16 | 34 | 21 | 36 | 17 |
| Hardness A (6 mm, 15 sec) | 75 | 76 | 75 | 78 | 78 | 76 | 76 | 75 | 78 | 80 | 74 |
| Melt Strength F (N) | 0.026 | 0.025 | 0.025 | 0.021 | 0.024 | 0.035 | 0.037 | 0.027 | 0.026 | 0.024 | 0.021 |
| Melt Strength V (1) | 28.2 | 22.4 | 24.5 | 17.3 | 22.1 | 25.7 | 23.5 | 26.3 | 21.2 | 21.1 | 19.9 |

TABLE 2

| Example | 12 | 13 | 14 | 15 | 16 | 17 | 18 | 19 | 20 |
|---|---|---|---|---|---|---|---|---|---|
| HSBC3 | 60 | 60 | 30 | 30 | 48 | 48 | 43 | 24 | 29 |
| HSBC7 | — | 3 | 30 | 30 | — | — | — | 24 | 29 |
| HSBC8 | — | — | — | — | 10 | 5 | 10 | 5 | — |
| PP125 | 30 | 30 | 30 | 20 | 30 | 30 | 30 | 30 | 20 |
| PP2030 | — | — | — | 10 | — | — | — | — | — |
| PP348 | — | — | — | — | — | — | — | — | 10 |
| Medicinal grade white oil | 3 | — | 3 | 3 | 5 | 10 | 10 | 10 | 5 |
| Functionalized polysiloxane antiscratch agent | 2.5 | 0.5 | 3.5 | 3.5 | 3.5 | 3.5 | 3.5 | 3.5 | 3.5 |
| Sterically hindered phenolic primary antioxidant | 0.1 | 0.1 | 0.1 | 0.1 | 0.1 | 0.1 | 0.1 | 0.1 | 0.1 |
| Organo-phosphite processing stabilizer | 0.2 | 0.2 | 0.2 | 0.2 | 0.2 | 0.2 | 0.2 | 0.2 | 0.2 |

TABLE 2-continued

| Example | 12 | 13 | 14 | 15 | 16 | 17 | 18 | 19 | 20 |
|---|---|---|---|---|---|---|---|---|---|
| hydroxyphenyl benzotriazole UV absorber | 0.3 | 0.3 | 0.3 | 0.3 | 0.3 | 0.3 | 0.3 | 0.3 | 0.3 |
| hindered amine light stabilizer | 0.4 | 0.4 | 0.4 | 0.4 | 0.4 | 0.4 | 0.4 | 0.4 | 0.4 |
| carbon black masterbatch colorant | 2.5 | 2.5 | 2.5 | 2.5 | 2.5 | 2.5 | 2.5 | 2.5 | 2.5 |
| Total | 100 | 100 | 100 | 100 | 100 | 100 | 100 | 100 | 100 |
| SEBS MW Ratio | 0 | 2.5 | 2.5 | 2.5 | 1.2 | 1.2 | 1.2 | 2.5 | 2.5 |
| MFR 230 C./2.16 kg | 4.7 | 2.6 | 4.1 | 9.9 | 27 | 125 | 40 | 26 | 18 |
| Hardness A (6 mm, 15 sec) | 91 | 92 | 88 | 88 | 93 | 82 | 90 | 85 | — |
| Melt Strength F (N) | 0.039 | 0.047 | 0.031 | 0.024 | 0.063 | 0.015 | 0.052 | 0.038 | 0.029 |
| Melt Strength V (1) | 16.1 | 11 | 25.7 | 17.3 | 13.7 | 37.5 | 16.2 | 21.5 | 26.3 |

In general, the disclosure may alternately comprise, consist of, or consist essentially of, any appropriate components herein disclosed. The disclosure may additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A foamed article made from a composition consisting essentially of:
100 phr of at least two different hydrogenated styrenic block copolymers (HSBC), a first HSBC and a second HSBC, having different molecular weights, a molecular weight ratio of at least 1.2:1, respectively; and a weight ratio of ranging from 5:95 to 95:5, respectively; wherein at least one of the first and second HSBC has a melt flow rate of >40 g/10 min (230° C./2.16 kg)
10-55 phr of a polypropylene having a melt flow of at least 2 g10/min according to ASTM D1238-82 (230° C./5 kg);
a plasticizer in an amount of up to 30 phr selected from hydrocarbon based oils, fatty acids, triglyceride oils, and mixtures thereof;
wherein the composition has a melt flow rate of 2-50 g/10 min (230° C., 2.16 kg per as measured by ASTM D1238-04), a Shore A hardness of 60-90 (15 sec, 23° C.) as measured according to ISO 868, a melt strength (F) of at least 0.010 N, and a melt strength (V) of at least 10;
wherein the foamed article is formed by foam injection molding or foam extrusion;
wherein the foamed article has a density reduced by at least 10% relative to an article formed from the composition that has not been foamed; and
wherein the foamed article has a non-foamed skin layer completely encasing a foamed inner core.

2. The foamed article of claim 1, wherein the non-foamed skin layer has a thickness of 0.1-5 mm.

3. The foamed article of claim 1, wherein the foamed inner core has a thickness of 0.1-20 mm.

4. The foamed article of claim 1, wherein the composition further comprises one or more other polymeric ingredients selected from the group consisting of thermoplastic polyurethane, thermoplastic copolyester, engineering thermoplastic resins, polyester, poly(aryl ether), poly(aryl sulfone), acetal resin, polyamide, nitrile barrier resins, poly(methyl methacrylate), cyclic olefin copolymers, coumarone-indene resin, polyindene resin, poly(methyl indene) resin, polystyrene resin, vinyltoluene-alphamethylstyrene resin, alphamethylstyrene resin, polyphenylene ether, poly(2,6-dimethyl-1,4-phenylene ether), copolymers thereof, and mixtures thereof.

5. The foamed article of claim 1, wherein the composition further comprises 1-30 phr of additives based on 100 phr of the at least two different hydrogenated styrenic block copolymers.

6. The foamed article of claim 1, wherein the first and second HSBCs are independently selected from selectively hydrogenated styrene-diene block copolymers, selectively hydrogenated styrene-diene-styrene triblock copolymers, selectively hydrogenated styrene-diene diblock copolymers, selectively hydrogenated resins of styrene-diene-styrene triblock copolymers, selectively hydrogenated styrene-diene random copolymers, selectively hydrogenated styrene-diene random copolymers, selectively hydrogenated controlled distribution styrene-diene/styrene block copolymers, selectively hydrogenated controlled distribution styrene-diene/styrene-styrene block copolymers, and combinations thereof.

7. The foamed article of claim 6, wherein the selectively hydrogenated styrene-diene block copolymers, prior to hydrogenation, are styrenic block copolymers comprising a diblock copolymer of formula A-B or A-B/A, a linear triblock copolymer of formula A-B-A or A-B/A-A, or a multi-arm coupled block copolymer of formula $(A-B)_nX$ or $(A-B/A)_nX$, where A is a monoalkenyl arene polymer block, B is a conjugated diene polymer block, and B/A indicates a polymer block having a controlled distribution of monoalkenyl arene in the conjugated diene polymer block, n is 2 to 6, and X is a coupling agent residue.

8. The foamed article of claim 6, wherein the first and second HSBCs are selectively hydrogenated styrene-diene block copolymers independently selected from S-EP-S, (S-EP)nX, S-EEP-S, (S-EEP)nX, S-EB-S, (S-EB)nX, S-EB/S-S, and (S-EB/S)nX;
  wherein S is a polystyrene block, EB is a hydrogenated polybutadiene block, EP is a hydrogenated polyisoprene block, EEP is a hydrogenated polymer block of butadiene and isoprene, n is 1 to 6, and X is a coupling agent residue.

9. The foamed article of claim 7, wherein the selectively hydrogenated styrene-diene block copolymers, prior to hydrogenation, are styrenic block copolymers having a polybutadiene block with a vinyl content of from 10 to 95 mol %.

10. The foamed article of claim 7, wherein the selectively hydrogenated styrene-diene block copolymers have a total polystyrene content of from 10 wt. % to 65 wt. %.

11. The foamed article of claim 7, wherein at least 92 mol % of the polymerized butadiene units in the selectively hydrogenated styrene-diene block copolymers are hydrogenated.

12. The foamed article of claim 1, wherein the weight ratio of the first HSBC and the second HSBC ranges from 20:80 to 80:20.

13. The foamed article of claim 1, wherein the foamed article is selected from the group consisting of light-weight vehicle type applications selected from the group consisting of door panels, instrument panels, and consoles; shoe sole components, packaging, and padding materials.

14. The foamed article of claim 1, wherein the foamed article is made by an injection molding process, said process comprising:
  a) mixing the composition with a suitable blowing agent to form a mixture;
  b) filling a mold cavity with a melt of the mixture using an injection molding process;
  c) foaming the mixture in the mold cavity by reducing pressure and/or increasing temperature; and
  d) removing the foamed article from the mold cavity.

15. The foamed article of claim 1, wherein the foamed article is made by an extrusion molding process, said process comprising:
  a) mixing the composition with a suitable blowing agent to form a mixture;
  b) filling an extruder barrel with a melt of the mixture;
  c) extruding the mixture through a profile die and reducing pressure and/or temperature to create a foamed structure; and
  d) cutting the foamed article to desired length.

16. A foamed article made from a composition consisting essentially of:
  100 phr of at least two different hydrogenated styrenic block copolymers (HSBC), a first HSBC and a second HSBC, having different molecular weights, a molecular weight ratio of at least 1.2:1, respectively; and a weight ratio of ranging from 5:95 to 95:5, respectively;
  wherein the first HSBC comprises:
    a) a selectively hydrogenated copolymer having a formula, S-EB/S-S or (S-EB/S)nX, where X is a coupling agent residue and n is 1-6, with a controlled distribution of styrene in the midblock, a total polystyrene content of about 58%, a total molecular weight of about 250 kg/mol, and a melt flow rate of <1 g/10 min at 230° C./2.16 kg;
    b) a selectively hydrogenated copolymer having a formula, S-EB-S or (S-EB)nX, where X is a coupling agent residue and n is 1-6, with a total polystyrene content of about 13%, a total molecular weight of about 150 kg/mol, and a melt flow rate of about 9 g/10 min at 230° C./2.16 kg;
    or combinations thereof;
  wherein the second HSBC comprises:
    i) a selectively hydrogenated copolymer having a formula, S-EB/S-S or (S-EB/S)nX, where X is a coupling agent residue and n is 1-6, with a controlled distribution of styrene in the midblock, with a total polystyrene content of about 35%, a total molecular weight of about 125 kg/mol, and a melt flow rate of about 40 at 230° C./2.16 kg;
    ii) a selectively hydrogenated copolymer having a formula, S-EB-S or (S-EB)nX, where X is a coupling agent residue and n is 1-6, with a total polystyrene content of about 20%, a total molecular weight of about 67 kg/mol, and a melt flow rate of >100 g/10 min at 230° C./2.16 kg;
    or combinations thereof;
  10-55 phr of a polypropylene having a melt flow of at least 2 g/min according to ASTM D1238-82 (230° C./5 kg); and
  a plasticizer in an amount of up to 30 phr selected from hydrocarbon based oils, fatty acids, triglyceride oils, and mixtures thereof;
  wherein the composition has a melt flow rate of 2-50 g/10 min (230° C., 2.16 kg per as measured by ASTM D1238-04), a Shore A hardness of 60-90 (15 sec, 23° C.) as measured according to ISO 868, a melt strength (F) of at least 0.010 N, and a melt strength (V) of at least 10;
  wherein the foamed article is formed by foam injection molding or foam extrusion;
  wherein the foamed article has a density reduced by at least 10% relative to an article formed from the composition that has not been foamed; and
  wherein the foamed article has a non-foamed skin layer completely encasing a foamed inner core.

17. The foamed article of claim 16, wherein the non-foamed skin layer has a thickness of 0.1-5 mm.

18. The foamed article of claim 16, wherein the foamed inner core has a thickness of 0.1-20 mm.

19. The foamed article of claim 16, wherein the foamed article is selected from the group consisting of light-weight vehicle type applications selected from the group consisting of door panels, instrument panels, and consoles; shoe sole components, packaging, and padding materials.

20. The foamed article of claim 1, wherein the polypropylene has a melt flow of 2.5 g/10 min or less according to ASTM D1238-82 (230° C./2.16 kg).

\* \* \* \* \*